(12) United States Patent
Bishop et al.

(10) Patent No.: US 7,788,356 B2
(45) Date of Patent: Aug. 31, 2010

(54) REMOTE MANAGEMENT OF A CLIENT COMPUTER VIA A COMPUTING COMPONENT THAT IS A SINGLE BOARD COMPUTER

(75) Inventors: David A. Bishop, Redmond, WA (US); Paul B. Darcy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1338 days.

(21) Appl. No.: 10/990,530

(22) Filed: Nov. 18, 2004

(65) Prior Publication Data

US 2005/0097182 A1    May 5, 2005

Related U.S. Application Data

(63) Continuation of application No. 09/559,844, filed on Apr. 26, 2000, now Pat. No. 6,904,458.

(51) Int. Cl.
*G06F 15/173* (2006.01)
(52) U.S. Cl. ...................................... 709/223
(58) Field of Classification Search ........... 709/220, 709/201, 219, 217, 218, 249, 238, 232, 224, 709/226, 203; 708/501, 100; 715/215, 735, 715/736, 740; 370/230, 231, 232, 352, 389, 370/229, 254, 360, 338, 251; 705/5, 6, 1, 705/28, 26, 27, 56, 35, 37, 44, 10, 14, 30, 705/7; 455/33, 12
See application file for complete search history.

(56) References Cited

U.S. PATENT DOCUMENTS

| | | | |
|---|---|---|---|
| 5,325,529 A | 6/1994 | Brown et al. | |
| 5,737,528 A | 4/1998 | Konishi | |
| 5,815,652 A * | 9/1998 | Ote et al. ..................... | 714/31 |
| 5,999,179 A | 12/1999 | Kekic et al. | |
| 6,199,180 B1 * | 3/2001 | Ote et al. ..................... | 714/31 |
| 6,343,331 B1 | 1/2002 | Stirling | |
| 6,389,464 B1 * | 5/2002 | Krishnamurthy et al. .... | 709/220 |
| 6,401,116 B1 | 6/2002 | Okigami | |

(Continued)

OTHER PUBLICATIONS

First Office Action, Mailed Apr. 2, 2009, in U.S. Appl. No. 10/990,524, filed Nov. 18, 2004.

(Continued)

*Primary Examiner*—Nathan Flynn
*Assistant Examiner*—Mark O Afolabi
(74) *Attorney, Agent, or Firm*—Shook, Hardy & Bacon L.L.P.

(57) ABSTRACT

A computing component is provided for use in a client computer which has a client processor. The computing component includes a remote management processor that is operable to selectively control the client computer independently of the client's own processor or processors. The computing component also includes a network component that facilitates communication between the computing component and a remote management machine. A method of managing one or more clients in a computer system is also provided, where the clients have a client processor and a computing component installed on client. The computing component is independent of the client processor and is operable to selectively control the client. A network component is installed on the computing component. The method includes remotely controlling the client by communicating with the computing component through the network component utilizing a remote manager.

17 Claims, 4 Drawing Sheets

U.S. PATENT DOCUMENTS

| | | |
|---|---|---|
| 6,408,335 B1 | 6/2002 | Schwaller et al. |
| 6,446,124 B1 | 9/2002 | Collins et al. |
| 6,496,858 B1 | 12/2002 | Frailong et al. |
| 6,532,497 B1 | 3/2003 | Cromer et al. |
| 6,578,077 B1 | 6/2003 | Rakoshitz et al. |
| 6,581,166 B1 * | 6/2003 | Hirst et al. ............ 714/4 |
| 6,598,071 B1 * | 7/2003 | Hayashi et al. ............ 709/203 |
| 6,598,106 B1 | 7/2003 | Grieshaber et al. |
| 6,604,207 B2 | 8/2003 | Sheikh et al. |
| 6,654,914 B1 * | 11/2003 | Kaffine et al. ............ 714/43 |
| 6,760,766 B1 | 7/2004 | Sahlqvist |

OTHER PUBLICATIONS

Final Office Action, Mailed Nov. 13, 2009, in U.S. Appl. No. 10/990,524, filed Nov. 18, 2004.

Notice of Allowance, Mailed Feb. 16, 2010, in U.S. Appl. No. 10/990,524, filed Nov. 18, 2004.

\* cited by examiner

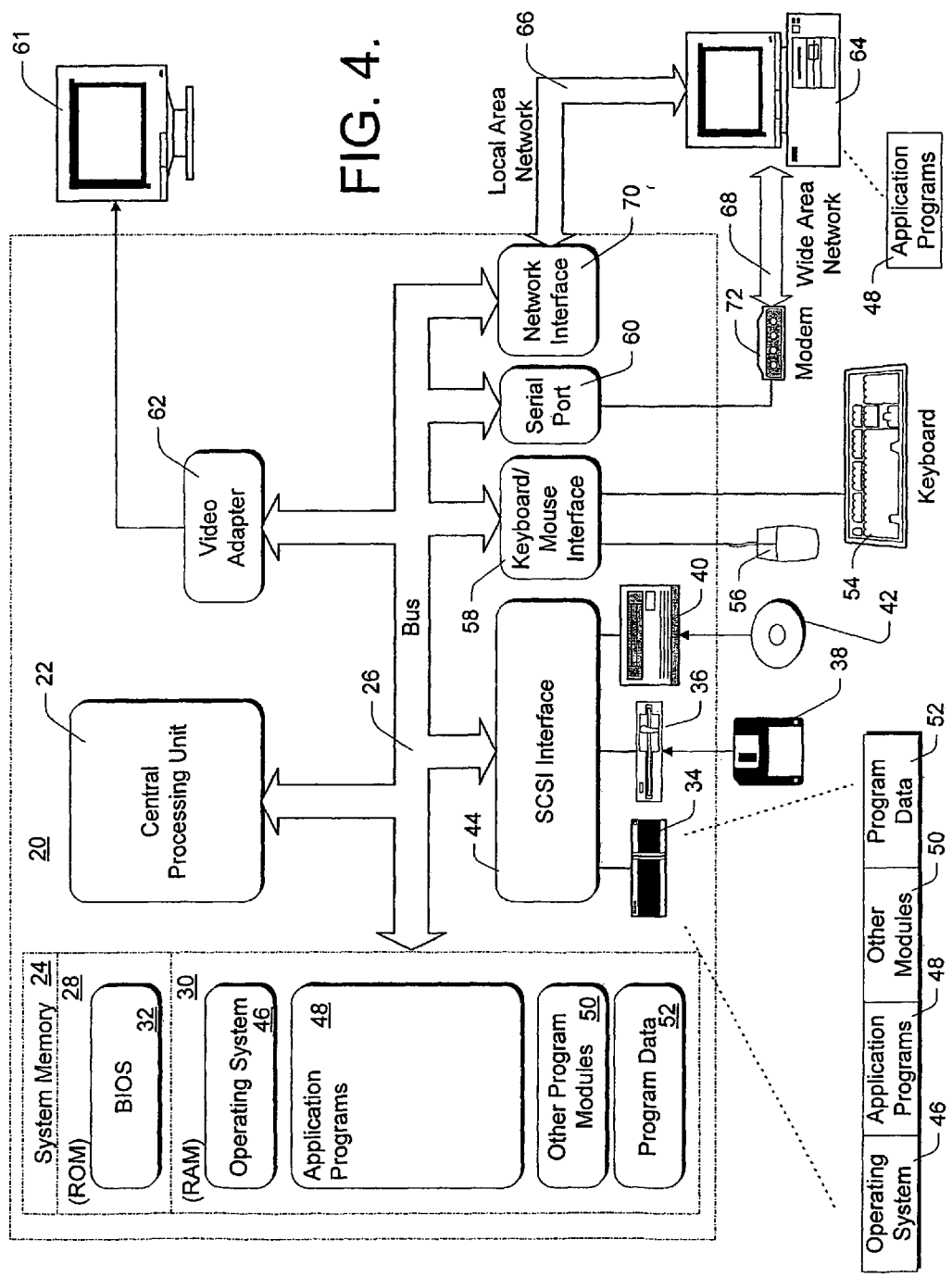

REMOTE MANAGEMENT OF A CLIENT COMPUTER VIA A COMPUTING COMPONENT THAT IS A SINGLE BOARD COMPUTER

PRIORITY

This patent is a continuation and claims a priority benefit of U.S. Pat. No. 6,904,458 U.S. application Ser. No. 09/559,844 entitled "SYSTEM AND METHOD FOR REMOTE MANAGEMENT," filed on 26 Apr. 2000.

FIELD OF THE INVENTION

The present invention relates to a computer system and, more particularly, to a system and method for remote management of a computer, such as a server in a network environment.

BACKGROUND OF THE INVENTION

A common arrangement for a computer system involves one or more client-server machines within a network. For example, a computer system may have thousands of servers operating in a number of different locations. The servers may be located in several different cities, or several different countries. However, it is desirable that the entire server system be manageable from a central location. Managing mission-critical servers in a distributed environment is difficult. In order to properly centralize server management in such a situation, the administrator at the central management location must be able to determine whether each of the servers in the system is running and working properly and whether each of the servers is performing the tasks required at the correct level of service. Additionally, if anything is beginning to deteriorate at any particular server, the administrator at the central management location needs to be informed in a timely fashion so that corrective actions can be taken. Ideally, the administrator should also be proactively warned that a particular server is deteriorating.

One conventional method of central server management involves utilizing management software on each server. However, this software analyzes only certain errors that may occur within certain parts of the server, and generates error logs. For example, in the International Organization for Standardization Open Systems Interconnection (ISO/OSI) model, there are seven layers. The available management software typically looks at only certain layers of the OSI stack. For example, some software monitors and maintains the hardware aspects of the server, while other software may only monitor the network or application layers of the OSI stack. This conventional approach limits the information gathered and does not always present the true status of the server. Another conventional method of central server management utilizes network management protocols. These protocols are low level protocols, such as SNMP (Simple Network Management Protocol), that can provide a basic indication of the health and performance of the server. Yet another conventional solution involves utilizing a monitoring and polling agent on each server. This agent sends back alerts to the central control console.

Each of the above conventional solutions presents drawbacks or disadvantages. For example, in order to monitor for a particular error, the type of error must be known. In other words, you must first know of the possibility of the error before you can monitor the server for the error. Additionally, the act of monitoring the server can create a large amount of monitored data that must be collected and sent to the central management location. The transmission of this monitored data can thus create a large amount of network traffic placing a strain on network communication resources. Further, each of the above conventional solutions utilizes the network link between the central management location and the server being managed. However, if the network link is down, possibly as a result of the server, then the ability to manage the server from the central management location is lost. Additionally, if the server suffers a catastrophic failure, the network connection will be lost. Moreover, once the server suffers the failure, any error logs or other data may be irretrievable. Moreover, the conventional software solutions focus only on certain layers of the OSI stack, rather than allowing access to the entire OSI stack.

Another problem arises if the operating system of the server is inoperable, or about to become inoperable, for some reason. If the server being monitored is showing signs of degradation, it may be desirable to perform a low-level reboot of the server. In this instance, under the conventional approach, someone must be sent to the location of the server to "reboot" the server and perform any required maintenance. In a server environment in which the server is located remotely from the central management location, this can result in a large amount of server down time as the technician travels to the server location.

Accordingly, there is a need for an effective system and method for managing a client from a central management location that allows access to all layers of the OSI stack. There is also a need for a system and method for managing a client from a central management location that does not rely upon the network link between the server and the central management machine to remotely manage the client. A need exists for a system and method for managing a client from a central management location that can be used to reboot and perform certain operations on a remote server computer from the central management location

SUMMARY OF THE INVENTION

In one aspect, the present invention is directed to a client computer for use in connection with a client computer system and a remote management machine. The client computer includes a client processor that is operable to control the client. The client computer further includes a computing component that has a remote management processor that is operable to selectively control the client computer independently of the client processor in response to instructions from the management machine.

Another aspect of the present invention is directed to a computer-readable medium having stored thereon computer executable components. The first component is a communication component that is operable to communicate with and control a client computer. The second component is a communication component that is operable to communicate with a remote manager.

Yet another aspect of the present invention involves a method of communication between a remote applications process and a client applications process in a computer system environment. The method involves querying the client applications process by the remote applications process for data indicative of one or more client properties and then transmitting the data from the client applications process to the remote applications process.

Still another aspect of the present invention is directed to a method of managing one or more clients in a computer system, where the clients have a client processor and a computing component installed on client. The computing component is independent of the client processor and is operable to selectively control the client. A network component is installed on the computing component. The method includes remotely controlling the client by communicating with the computing component through the network component utilizing a remote manager.

BRIEF DESCRIPTION OF THE SEVERAL VIEWS OF THE DRAWING

The present invention is described in detail below with reference to the attached drawing figures, wherein:

FIG. 4 is a block diagram of a suitable computing system environment for use in implementing the present invention.

DETAILED DESCRIPTION OF THE INVENTION

Figure 1:
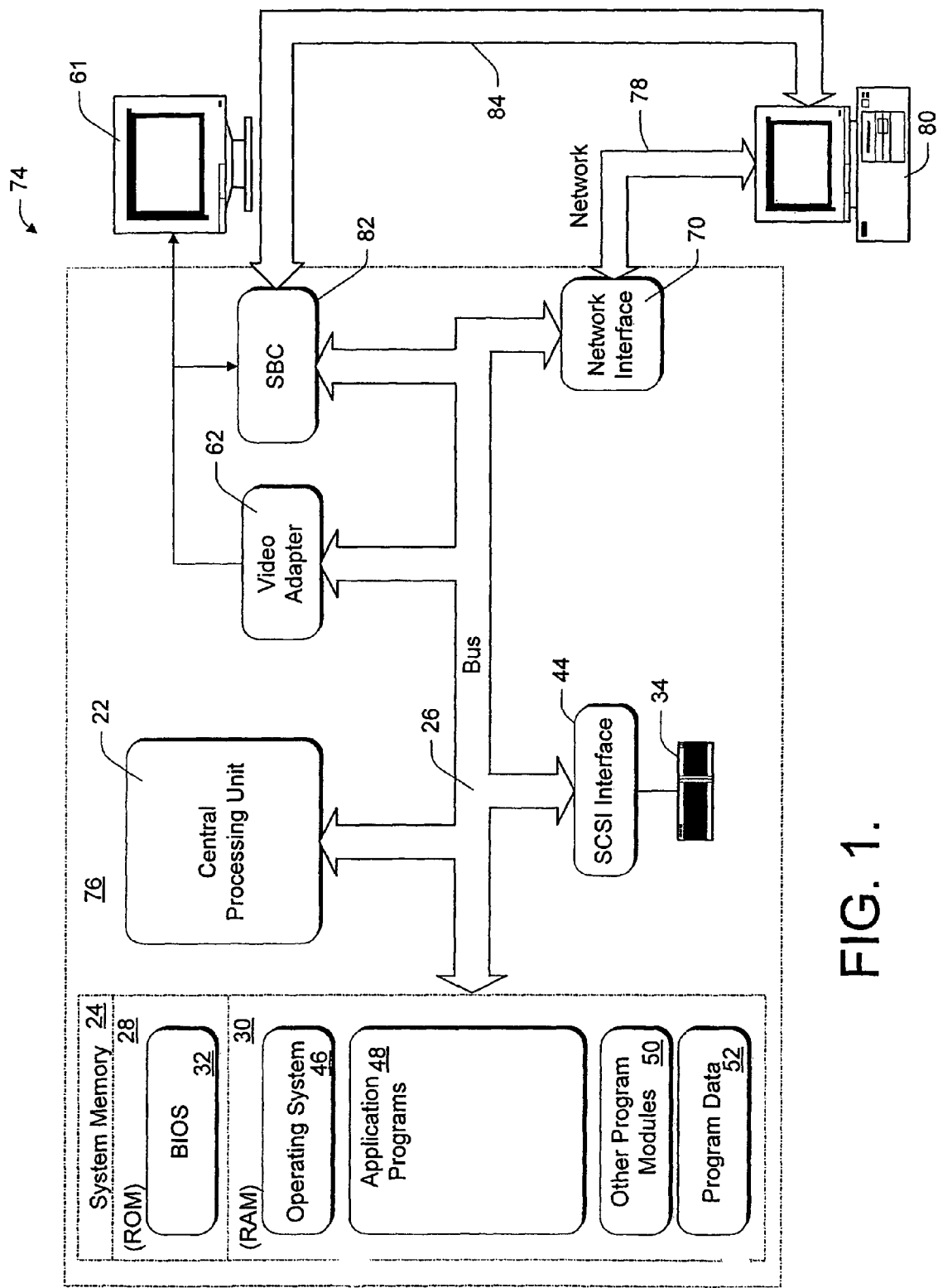
FIG. 1 is a block diagram of a computing system implementing a single board computing system in accordance with the present invention.

The present invention provides a system and method for remotely managing at least one client from a central location. FIG. 4 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 4 illustrates operating system 46, application programs 48, other program modules 50, and program data 52.

The computer 20 may also include other removable/non-removable, volatile/nonvolatile computer storage media. By way of example only, FIG. 4 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 4, provide storage of computer readable instructions, data structures, program modules and other data for the computer 20. In FIG. 4, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64, The remote computer 64 may be a personal computer, a server, a router, a network PC, a peer device or other common network node, and typically includes many or all of the elements described above relative to the computer 20, although only a memory storage device has been illustrated in FIG. 4. The logical connections depicted in FIG. 4 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 4 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 48 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

With reference to FIG. 1, an example of a suitable client computing system 74 implementing a single board computing component is illustrated in accordance with the present invention. In one embodiment of the present invention, the client computing system 74 involves a server client in a distributed server environment. The system 74 includes a client machine such as a server 76. Components of client 76 include, but are not limited to, a processing unit 22, a system memory 24, and a system bus 26 that couples various system components, including the system memory to the processing unit 22. These components, and other components associated therewith, were discussed above with reference to FIG. 4. It should be understood that system 74 can include other components, or fewer components. System 74 is only one example of a suitable client system and is not intended to suggest any limitation as to the scope of use or functionality of the invention.

With reference to FIG. 1, client 76 also includes a network interface or adapter 70 for coupling client 76 to a network 78. Network 78 could be any type of network connection, such as a LAN or a WAN. The client 76 is connected through network 78 to a management machine 80. Conventionally, management machine 80 would utilize a network, such as network 78, to communicate with client 76 in order to perform various management functions. However, if operating system 46 or network 78 becomes unavailable, the conventional configuration could not be used to manage client 76.

With continued reference to FIG. 1, the present invention preferably includes a single board computing component 82 installed on the bus 26 of the client 76. Preferably, component 82 is a single board computer installed on bus 26 in a location allowing computing component 82 to take control of bus 26, such as a priority one slot. Component 82 is in communication with management machine 80 as shown by the network connection 84. Network 84 may also be a LAN or a WAN. Moreover, networks 78 and 84 need not be the same type of network. While networks 78 and 84 are preferably separate networks, as shown, it should be understood that the invention includes a shared network, such as network 78. Still further, the computing component 82 may also utilize the network interface 70 of the client machine 76.

Figure 2:
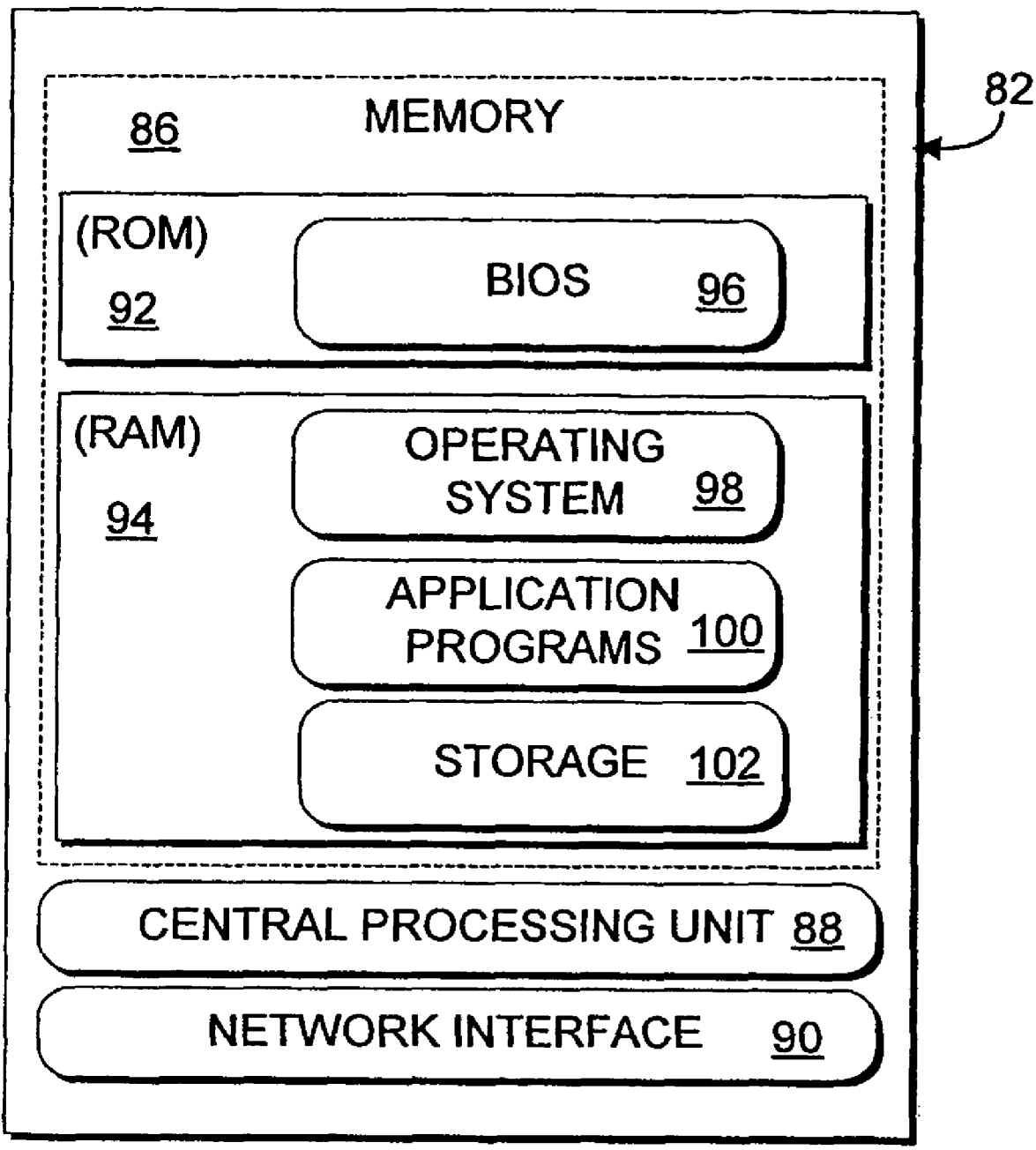
FIG. 2 is a block diagram of the preferred components of the single board computing system of FIG. 1.

Computing component 82 is shown schematically in FIG. 2 and broadly includes a memory 86, a central processing unit 88 and a network interface 90. The memory 86 includes computer storage media in the form of volatile and/or non-volatile memory such as read only memory (ROM) 92 and random access memory (RAM) 94. Preferably, at least 16 mega-bytes (MB) of memory are provided on computing component 82. A basic input/output system (BIOS) 96 is preferably stored in ROM 92. RAM 94 typically contains data and/or program modules that are immediately accessible to and/or presently being operated on by processing unit 88, such as operating system 98, application programs 100 and other storage 102. In a preferred embodiment, operating system 98 is Microsoft Corporation's WIDOWS EMBEDDED NT operating system and processor 88 is a base line Intel PENIUM processor or equivalent. As would be readily understood, the present invention is compatible with a variety of operating environments and/or processing systems, such as the use of a higher processor.

The network interface 90 allows direct communication with computing component 82 from a remote location. For example, management machine 80 could be used, along with network 84, to communicate directly with computing component 82. If network 84 and network 78 are separate and distinct networks, this communication can take place even though network 78 is not operational. In other words, when network 84 is separate from network 78, a completely redundant system is provided. In such a system, any management data sent over network 84 will not interfere with the normal client network traffic travelling over network 78. Moreover, because computing component 82 has its own operating system 98 and central processing unit 88, management machine 80 could be used to communicate with computing component 82 even though operating system 46 is not operational.

It can therefore be understood that computing component 82 is an operational computer installed on the system bus 26 of the client 76. Computing component 82 is separately addressable from the client via its own network interface 90. Being separately addressable, computing component 82 provides the ability to remotely manage and monitor the status and operation of the client 76. Moreover, computing component 82 includes its own memory. Therefore, if desired, computing component can store and run its own software, independently of the client 76.

Returning to FIG. 1, client 76 includes a monitor 61 connected to the system bus 26 via video adapter 62. As shown schematically in FIG. 1, the graphical data generated by the video adapter 62 can be captured and re-routed to computing component 82. The intercepted graphical data is then transferred from computing component 82 through network 84 to management machine 80. The operator of management machine 80 will receive the graphical data and utilize the data to control the client 76, as if the operator were physically present at the location of client 76. Intercepting and redirecting the graphical data of client 76 can be accomplished in any number of ways, as would be understood by those of skill in the art. For example, a specialized video driver could be directly installed on the client 76 to redirect the graphical data to the video adapter associated with computing component 82. Alternatively, a copy of the graphical data may be intercepted as it is being sent to the display 61. This copy is then sent to the computing component 82 and then out to the remote management machine 80.

Figure 3:
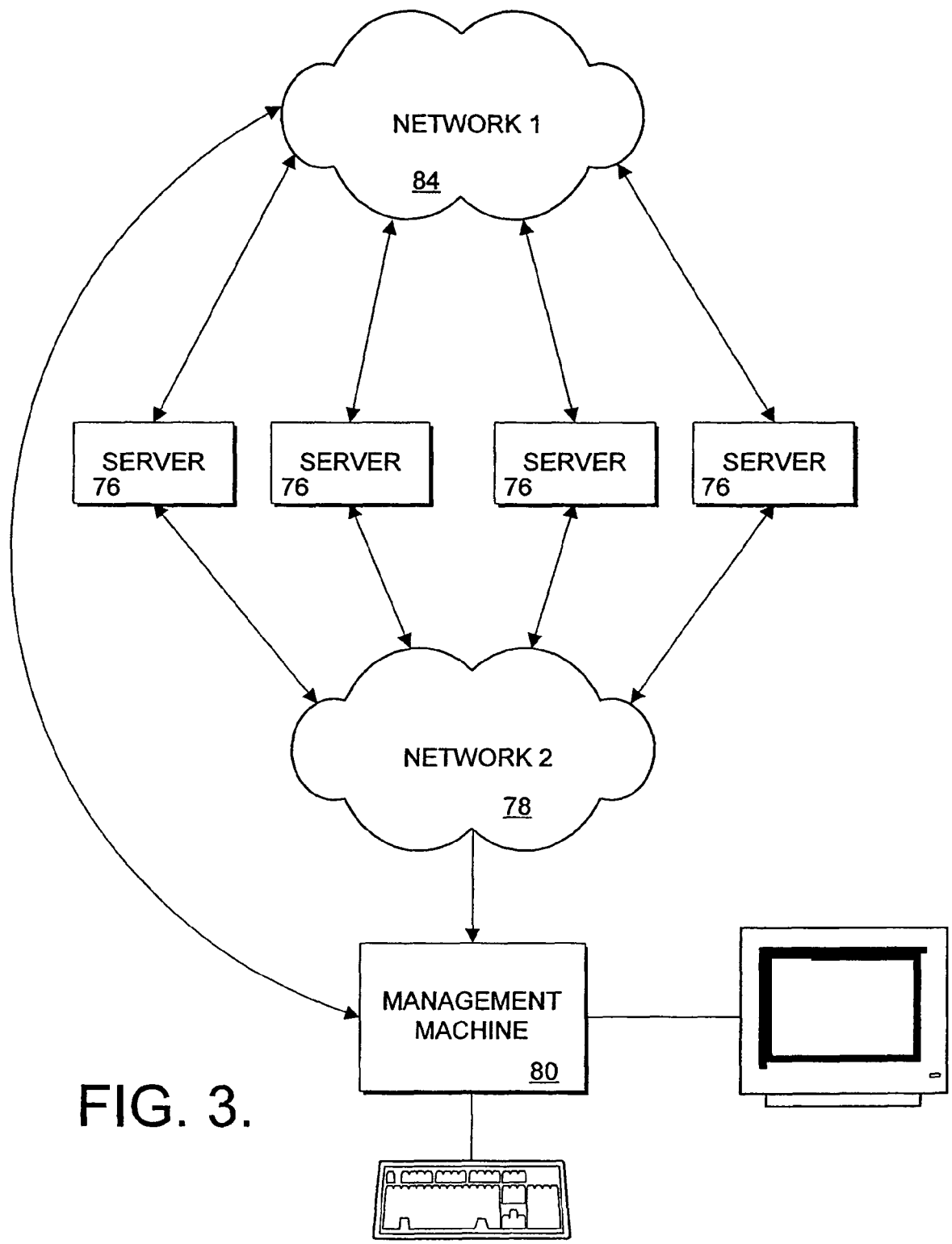
FIG. 3 is a diagram illustrating a preferred networked environment of the present invention.

In a preferred embodiment, the present invention is utilized within a distributed server environment, as shown in FIG. 3. In this environment, a number of server clients 76 are provided. Each of these servers may exist in a different physical location. In some distributed server environments, the servers 76 may be located in different countries from one another. Each server 76 shown in FIG. 3 preferably has installed thereon a computing component 82 (FIG. 2) as discussed above. In the preferred embodiment, each server is connected to network 78, which in turn is connected to remote management machine 80. In addition, each computing component 82 is connected to a second network 84, which is also connected to management machine 80. By incorporating a separately addressable computing component 82 with its own network interface 90, the operators of management machine 80 can communicate directly with computing component 82 and provide complete management of client 76 from the remote location of machine 80. Moreover, in the preferred embodiment described above utilizing two separate networks, a completely redundant system is provided. This allows the management of client 76 to continue in the event network 78 or client 76 is not operational.

Computing component 82 can be used to manage each client 76 remotely even in the event of a serious failure of the particular server. This management capability exists even in the event that the operating system 46 of the client 76 is inoperable or partially inoperable. To provide this capability, computing component 82 must be capable of taking control of the bus 26 and running as a bus-master on client 76. Computing component 82 can receive information, assess that information and react to the information. Therefore, via instruction from management machine 80, the computing component 82 is capable of rebooting the client 76 and taking control of the client bus 26. In such a situation, the operating system 98 of computing component 82 is not intended to replace the operating system 46 of the client, but does allow complete remote access to the client 76 and its software in order to recover from a disaster situation.

Computing component 82 thus has the capability of taking control of the bus 26. However, the processing unit 22 of the client and the processing unit 88 of computing component 82 cannot have control of the bus 26 at the same time. Therefore, computing component 82 must have the capability of selectively assuming control of bus 26. A number of approaches exist to allow the computing component 82 to selectively assume control of the bus 26. For example, each processor can be instructed to start at a different address. In other words, the processor 88 and the processor 22 each have a different booting address. By incorporating different starting addresses, the computing component 82 and processing unit 22 will not try to implement the same BIOS.

Therefore, the processing unit having control of the bus can be selected based upon the initial starting address used. Another method involves the introduction of the basics of a multi-master bus system. Under this method, logic is incorporated at the bus-interface level of the computing component 82. This logic allows the computing component to access and take control of the bus 26. Yet another approach is available when the operating system of the client 76 can accommodate a number of processors. For example, in Microsoft Corporation's WINDOWS NT operating system, eight central processing units can be used. In such a case, all eight processing units boot at the same time. It is therefore possible to dedicate seven of the central processing units to client 76 and reserve one for the computing component 82. It can therefore be seen that a number of approaches exist which allow computing component 82 to selectively assume control of the bus 26.

Utilizing the present invention, the system administrator is able to select and address the computing component 82 directly and initiate a remote session. Because computing component 82 is separately addressable from the client 76, the particular computing component associated with the desired client can be selected for this remote session. Moreover, because the graphical user interface of the client is intercepted and routed to the management machine 80, the administrator has the capability of conducting all tasks as if someone were physically present at the console of the client 76. The computing component resides on the bus 26, and allows the administrator fill access to the client, including all layers of the OSI stack. The administrator can fully administer the server, view event logs or trigger performance monitor counter sessions as if physically present at the console of the client.

At the operating system level, the computing component can be used to run management processing, such as enterprise management functions, including performance monitoring and capacity planning. For example, the computing component 82 can be used to instruct the client 76 to collect various management data. Results from various polling functions, such as Microsoft Corporation's PERFMON functionality, are submitted to the computing component 82. The operating system 98 of the computing component may receive the data to perform analysis, such as determining whether a service level agreement has been violated. The computing component 82 can also manage and store the data locally on the computing component for later transmission to the management machine 80. Accordingly, the computing component facilitates client management while reducing the strain on client resources.

Similarly, computing component 82 can be used to monitor client applications processes. Therefore, at the application level, the computing component 82 can be configured to run application-specific monitoring. For example, the computing component 82 can be configured to monitor the status of mission-critical application running on the client 76. In the event of a serious application level failure, the system administrator can directly access the computing component 82 and run a remote session through it. The administrator has fall access to all files and data on the client 76 and can run any application-specific tools through the computing component 82.

The system administrator can also utilize the computing component 82 to deploy new software on the client 76. For example, if the system administrator desires to deploy new management software, the computing component can be used to execute this deployment. In such a situation, the administrator addresses the computing component from management machine 80. The desired software is transferred over network 84. The software is thus stored locally on the computing component 82, and can be run against the operating system 46 of the client each time the computing component boots. The computing component 82 can also be used as an intermediary for the installation of software on the client 76. The software can be transferred to the computing component 82 and stored thereon until it is desired to install the software on the client thereby allowing the administrator to schedule the installations. The administrator could also use the computing component 82 to Monitor a software installation that is taking place on the client 76. This software installation could also be performed in conjunction with the monitoring of the client 76, whereby the installation would be completed when specified conditions exist on the server, such as when the server is not busy completing other tasks. Computing component 82 could also be configured by the administrator to install the software at a particular time or according to a schedule.

The computing component 82 also allows the system administrator to trigger a hardware-level reboot on the client 76, by sending such an instruction to computing component 82 via management machine 80. Computing component 82 includes on-board logic that can be triggered to trip the boot logic on the bus 26. By triggering the boot logic, a low-level reboot (or "power cycle") of client 76 is performed. This power cycling is done remotely by the system administrator, without the need of a person physically present at the location of client 76. Such a power cycling may be needed if the client 76 is showing a degradation in performance. This facilitates a single distribution of software requiring no further service by the administrator.

Alternative embodiments of the present invention will become apparent to those skilled in the art to which it pertains upon review of the specification, including the drawing figures. Accordingly, the scope of the present invention is defined by the appended claims rather than the foregoing description.

We claim:

1. A client computer for use in connection with a client computer system and a remote management machine, the client computer comprising:

a client processor, in the client computer, operable to control the client computer, wherein the client computer is monitored by the remote management machine over a first communication path, the first communication path connecting the client computer with the remote management machine over a first network; and a computing component, that is a single board computer, in the client computer, having a remote management processor operable to selectively control the client computer, independently of the client processor, in response to instructions received over a second distinct communication path from the remote management machine, the second distinct communication path connecting the computing component with the remote management machine over a second network distinct from the first network, wherein the computing component is installed in a priority slot on a system bus of the client computer connecting the client processor and the computing component, the priority slot allows the computing component to assume control over the client computer, to monitor specific applications, or to access information stored on the client computer.

2. The client computer of claim 1, further comprising a network component installed on the computing component, facilitating communication with the remote management machine.

3. The client computer of claim 2, wherein the client computer system includes two or more clients configured in a network environment.

4. The client computer of claim 3, wherein the computing component, network component, and the client networked environment are separate.

5. The client computer of claim 1, wherein the client computer is a server computer.

6. A computer-storage medium having computer-executable components, comprising:

a first communication component, that is a single board computer, in a client computer, for communicating with and operable to selectively control the client computer after receiving instructions over a first communication path from a remote manager in a client networked environment, wherein the client computer has an operating system and hardware components therein, and the first communication component is operable to control the operating system and hardware components of the client computer and the first communication component is installed in a priority slot on a system bus of the client computer connecting a client processor and the first computing component, the priority slot allows the first communication component to assume control over the client computer, to monitor specific applications, or to access information stored on the client computer; and a second communication component, in the client computer, for communicating with the remote manager independently of the client networked environment over a second distinct communication path in an alternative networked environment.

7. The computer-storage medium of claim 6, further comprising an interface component for capturing and transferring client display information to the remote manager.

8. The computer-storage medium of claim 7, wherein the display information is graphical display information.

9. The computer-storage medium of claim 6, wherein the first communication component includes a client management component operable to request, collect and store client management data.

10. The computer-storage medium of claim 9, wherein the client management data includes capacity planning data.

11. The computer-storage medium of claim 9, wherein the client management data includes performance monitoring data.

12. A client computer, the client computer comprising:
- a client processor, in the client computer, operable to control the client computer, wherein the client computer is monitored by a remote management machine over a first communication path, the first communication path connecting the client computer with the remote management machine over a first network;
- a single board computing component (SBC), in the client computer, having a remote management processor operable to selectively control the client computer, independently of the client processor, in response to instructions received over a second distinct communication path from the remote management machine, the second distinct communication path connecting the computing component with the remote management machine over a second network distinct from the first network; and
- a system bus, in the client computer, coupling the client processor and single board computing component, wherein the SBC is installed in a priority slot on the system bus, wherein the priority slot allows the SBC to assume control over the client computer, to monitor specific applications, or to access information stored on the client computer.

13. The client computer of claim 12, further comprising a network component installed in the SBC and a network component of the client computer independent and separate from the SBC network component.

14. The client computer of claim 13, wherein the a system bus couples the client computer network component to the client processor and the SBC.

15. The client computer of claim 14, wherein the SBC further contains an operating system and memory independent of the client computer.

16. The client computer of claim 12, wherein only one of the client processor and SBC are allowed to control the client computer at any time.

17. The client computer of claim 12, wherein the SBC is operable and reachable during failure of the client computer, failure of the first communication path, or failure of the first network.

* * * * *